Dec. 20, 1932.  W. TURNER  1,891,853
FLUID PRESSURE INDICATOR FOR PNEUMATIC TIRES AND OTHER INFLATED BODIES
Filed Feb. 7, 1930
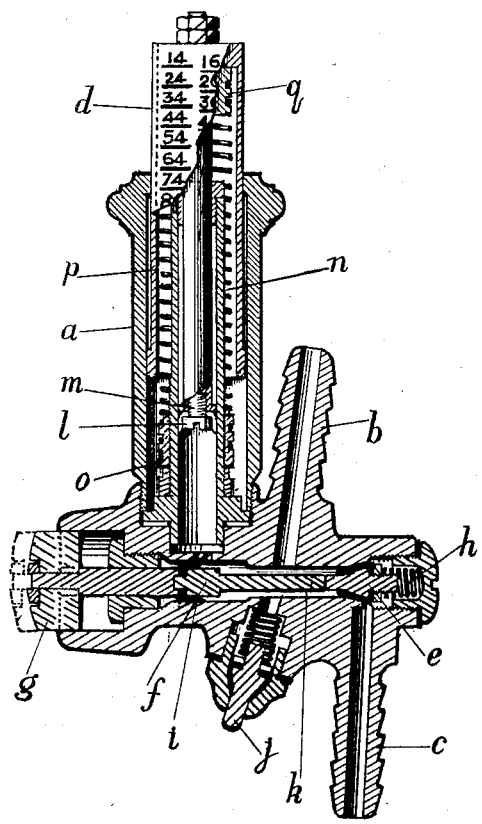
INVENTOR
William Turner
BY
Connally Bros
ATTORNEYS

UNITED STATES PATENT OFFICE

WILLIAM TURNER, OF SHEFFIELD, ENGLAND

FLUID PRESSURE INDICATOR FOR PNEUMATIC TIRES AND OTHER INFLATED BODIES

Application filed February 7, 1930, Serial No. 426,734, and in Great Britain December 19, 1929.

This invention relates to apparatus of the kind described in my pending British patent application No. 25,301 of 1929, and consists in an improvement in or modification of the apparatus therein described, which has for its primary object to adapt such apparatus to the case in which the pneumatic tire or other body is inflated from a tank in which the air for inflation is stored under pressure.

The modified apparatus comprises a casing provided with two nipples for the attachment of flexible or other suitable tubes leading respectively from the storage tank and to the tire or other body to be inflated, and this casing is also provided with suitable means for the attachment of a pressure gauge or indicator which may be conveniently of the character of that described in my pending British patent application No. 15,127 of 1929. Communication between the storage tank and the tire is controlled by a spring-loaded valve which normally cuts off such communication and under such conditions the inside of the tire is connected with the pressure indicator.

Means are provided for, at will, cutting out the pressure indicator and for unseating the valve so that the storage tank can be put into communication with the tire. Such means preferably consists of a pin slidably mounted in axial alignment with the valve and provided with a push-button, whereby it may be pressed inwards to push the valve off its seat against the action of its return spring. Before this happens, however, an obturator, such for example as a cup leather, carried by the pin, cuts off communication between the pressure indicator and the storage tank so that the indicator is never in communication with the tank.

The casing is also provided with a deflating valve which can at will be pushed off its seat so as to put the communicating passage between the tire and the pressure indicator into communication with the atmosphere, thus enabling pressure in the tire to be reduced to its proper value in the case of over inflation.

As the pressure indicator has to be capable of indicating a wide range of pressures, the indicator stem must have a large surface for the exhibition of the divisions of the scale on which the pressure is read. On the other hand, as the indicator has to measure high pressures, it is desirable that the piston area should be small. To meet these conditions the indicator is made as follows: The piston or cup leather which takes the pressure is mounted at one end of a rod freely slidable within a fixed tube, and the other end of the rod is attached to the outer end of a cylinder of comparatively great diameter which forms the indicating stem. The fixed tube is screw threaded at its inner end to take an internally threaded collar which can be screwed to a greater or less extent on to the tube and secured in any desired position thereon by means of a lock-nut. This collar has an external thread cut on it to receive the end of the indicator coil spring which encircles the fixed tube. The other end of the coil spring may be similarly attached to a collar through which the end of the piston rod projects, and which is engaged by a shoulder to extend the spring as the pressure increases. This means of attachment provides a second adjustment by altering the effective length of the spring.

The invention is illustrated in the accompanying drawing which is a longitudinal section.

The casing $a$ is provided with two nipples $b$ and $c$ for the attachment of flexible or other suitable tubes leading respectively from the storage tank and to the tire or other body to be inflated, and this casing is also provided with suitable means for attachment of a pressure gauge or indicator $d$ which may be conveniently of the character of that described in my pending British patent application No. 15,127 of 1929. Communication between the storage tank and the tire is controlled by a spring-loaded valve $e$ which normally cuts off such communication and under such conditions the inside of the tire is connected with the pressure indicator.

Means are provided for, at will, cutting out the pressure indicator and for unseating the valve so that the storage tank can be put into communication with the tire. Such means preferably consists of a pin $f$ slidably mounted in axial alignment with the valve and provided with a push-button $g$, whereby it may be pressed inwards to push the valve off its seat against the action of its return spring $h$. Before this happens, an obturator, such for example as a cup leather $i$, carried by the pin $f$, cuts off communication between the pressure indicator and the storage tank so that the indicator is never in communication with the tank.

The casing is also provided with a deflating valve $j$ which can at will be pushed off its seat so as to put the communicating passage $k$ between the tire and the pressure indicator into communication with the atmosphere, thus enabling pressure in the tire to be reduced to its proper value in the case of over inflation.

As the pressure indicator has to be capable of indicating a wide range of pressures, the indicator stem must have a large surface for the exhibition of the divisions of the scale on which the pressure is read. On the other hand, as the indictor has to measure high pressures, it is desirable that the piston area should be small. To meet these conditions the indicator is made as follows: The piston or cup leather $l$ which takes the pressure is mounted at one end of a rod $m$ freely slidable within a fixed tube $n$, and the other end of the rod is attached to the outer end of a cylinder $d$ of comparatively greater diameter which forms the indicating stem. The fixed tube $n$ is screw threaded at its inner end to take an internally threaded collar $o$ which can be screwed to a greater or less extent on to the tube and secured in any desired position thereon by means of a lock nut thereby providing for the adjustment or alteration of the effective length of the spring. This collar has an external thread cut on it to receive the end of the indicator coil spring $p$ which encircles the fixed tube. The other end of the coil spring may be similarly attached to a collar $q$ through which the end of the piston rod projects, and which is engaged by a shoulder on the upper end of the piston rod to extend the spring as the pressure increases.

Having thus described the nature of the said invention and the best means I know of carrying the same into practical effect, I claim:—

In a fluid pressure indicator of the character described a piston, a rod upon which the piston is mounted, a fixed tube within which said piston is slidably movable, a pressure indicating tubular member of comparatively large diameter, secured to said rod and surrounding said fixed tube, and spaced therefrom, a coiled spring located between said fixed tube and said indicating tube, with one end secured to said rod, an adjustable collar, to which the other end of the coiled spring is attached, screwed on to the fixed tube and a lock nut to hold said collar in position on the fixed tube.

In testimony whereof I affix my signature.

WILLIAM TURNER.